UNITED STATES PATENT OFFICE.

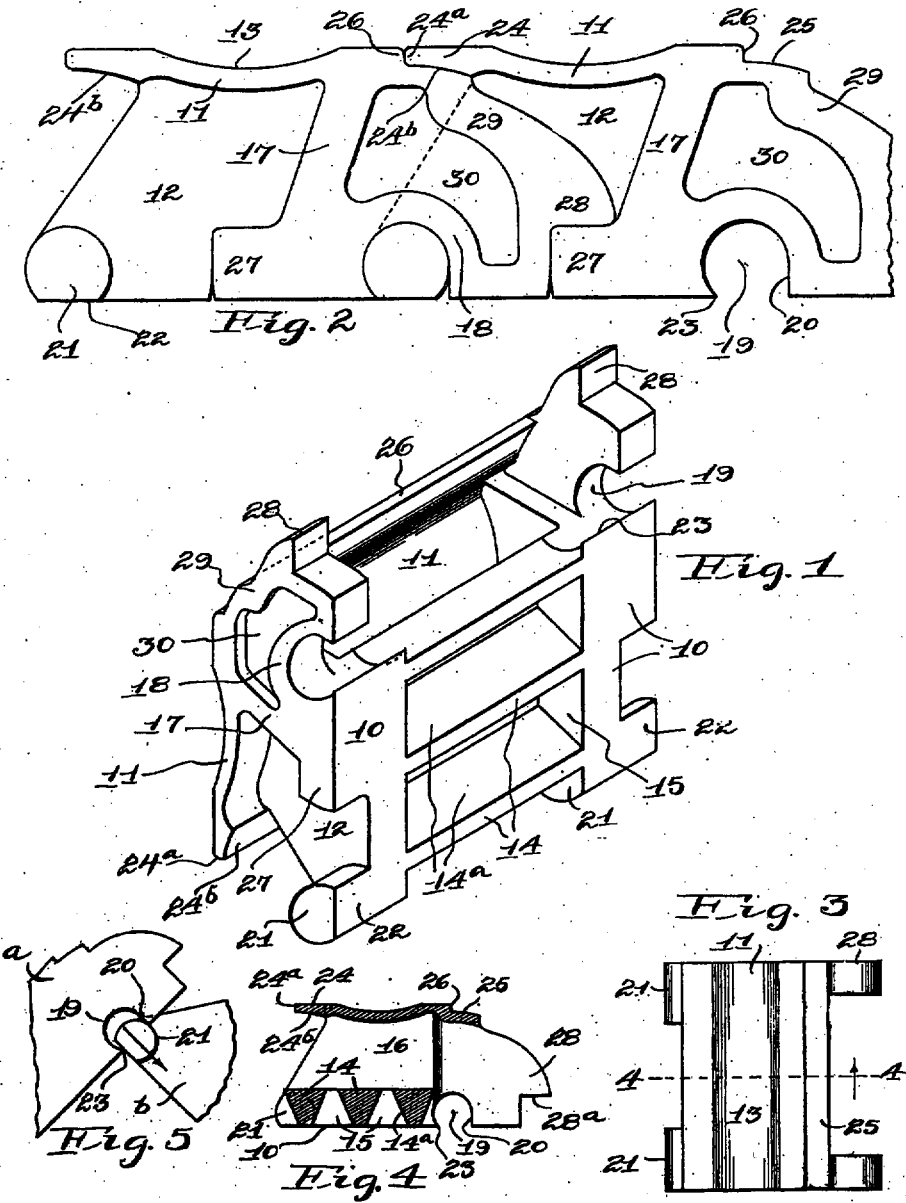

JOHN FROELICH, OF ST. PAUL, MINNESOTA.

CATERPILLAR-TREAD.

1,282,063.  Specification of Letters Patent.  Patented Oct. 22, 1918.

Application filed June 24, 1914. Serial No. 847,005.

*To all whom it may concern:*

Be it known that I, JOHN FROELICH, a citizen of the United States, residing at St. Paul, in the county of Ramsey and State of Minnesota, have invented new and useful Improvements in Caterpillar-Treads, of which the following is a specification.

My invention relates to cast metal treads for what are known as caterpillar tractors, which embody endless chain treads running over sprocket wheels.

In such tractors as heretofore constructed it has been necessary to provide a number of tread supporting rollers, so that each of the tread units in the lower series may bear with equal pressure upon the ground. In running over stones and other inequalities with such a tractor, an excessive weight is thrown on one or two tread units, thence on the superposed rollers, thereby sometimes breaking off the roller spindles. This necessitates repair, and meanwhile decreases the tractive power of the vehicle.

The object of my invention is to make the series of tread units self sustaining, and this object is effected by the peculiar and novel construction of each tread unit, hereinafter described and claimed.

Referring to the accompanying drawings, Figure 1 is a perspective of a tread unit constructed according to the invention, viewed from its inner side; Fig. 2 is a side elevation of two of the tread units in assembled relation; Fig. 3 is a plan view of the tread face of a tread unit; Fig. 4 is a sectional view on a line 4—4 of Fig. 3; and Fig. 5 is a diagram showing the manner in which two associated treads may be separated.

Each of the treads or tread units herein shown is cast in one piece and all are precisely alike, so that a description of one applies to all.

In general, each tread unit may be said to comprise a base or body portion 10, a tread plate 11 and a pair of webs 12 that unite the base and tread portions. The body 10 merges into the inner portion of the webs 12 and includes (as shown three) transverse ribs 14 having inclined lateral faces 14$^a$ which provide suitable slots 15 to receive the teeth of the usual toothed driving wheels of a caterpillar tractor. The inner face of the base 10 is flat, as clearly shown on Fig. . The tread plate 11 is rectangular in outline, as shown by Fig. 3, and has a transverse concavity 13 in its outer face. The webs 12 are spaced, as shown, and there is a hollow 16 between the tread plate 11 and base 10, which hollow lightens the casting without reducing its strength.

Integral with one end of each web 12 is a heavy rib 17 extending from the inner to the outer face of the tread and each rib 17 merges into a boss 18 in which is a cylindrical socket 19, open at both ends and also at its bottom. Each socket has a portion of its wall cut away at right angles to the line of travel, as shown at 20, for a reason presently set forth. The sockets 19 at the two ends of the tread are duplicates, and are in alinement with each other.

Each of the webs 12 is provided upon its inner corner, opposite the socket 19, with a pintle 21 which is dimensioned to fit pivotally within a socket of the next tread in the chain, as shown on Fig. 2. Each pintle 21 is cut away at 22, in the general plane of the base. In other words, each stud 21 is cut away upon the chord of a circle and in the plane of travel of the tread. The reduction in diameter thus effected is only sufficient to permit the studs to be removed from their sockets 19 when necessary, and this is done by first turning the two treads (marked $a$ and $b$ on Fig. 5) from their normal relation to a right angled relation, and disengaging the tread $b$ in the direction of the arrow. Normally, however, it will be impossible for any tread to become detached from the series, because the lips 23 of the sockets 19 embrace a sufficient part of the studs 21 to prevent this.

Each tread plate 11 is provided on one side thereof with a part 24 hereinafter termed a flange or abutment flange. The flange 24 of each tread plate is adapted to overlap the surface 25 of an adjacent tread plate. The surface 25 is depressed (as shown) to form a shoulder 26 which abuts the outer edge 24$^a$ of flange 24 when two connected treads are in alinement as they will be at the top and bottom of the chain, on the tractor wheels. The surface 25 is shown as convex with its center of curvature at the center of the pintle 21. The inner face 24$^b$ of flange 24 is correspondingly curved.

Considering a horizontal series of treads connecting the upper sides of the drivewheels (a portion of such a series being shown by Fig. 2) it is evident that the weight of the parts will tend to cause the chain to sag, as it does in ordinary caterpillar treads, were exterior supporting means not provided. The abutting parts 24ª and 26, however, in this tread render sagging impossible.

Considering now, the series of treads resting upon the ground where their positon is inverted from that shown on Fig. 2, and supposing that the tractor passes over a hump or stone, the effect will be that extra upward pressure will be exerted on some or all of the tread units resting upon the stone or hump. But the series cannot bend upwardly, hence it will act as a substantially straight beam and will support the wheels and frame of the tractor. When running on flat ground, this property of the tread chain or series obviates the use of depression rollers or guides, and causes each tread unit to exert downward pressure as if such depression guides were employed.

In order to reduce the occasionally heavy stress on the treads, it is thought desirable to provide each tread with auxiliary abutments which will coact simultaneously with the abutments above described. One form of such provision is shown on Figs. 1 and 2, wherein 27 is a heavy lug which projects from the rib 17 and is located at the inner side of the tread. A coacting nose-shaped abutment 28 is formed on the opposite side of the pivot socket and continues outwardly as a rib 29 which is in fact a thickening of the end web 30, the latter being an extension of the main web 12 but, as shown on Fig. 1, thicker than web 12.

An endless chain of the treads described may be assembled in the manner indicated by Fig. 5, and such a chain will be self-supporting at both top and bottom, as has already been shown. This construction will greatly reduce the cost of tractors of the type referred to, and has additional advantages because of the reduction in the number of wearing parts and of parts liable to breakage.

Having described my invention, what I claim as new and desire to protect by Letters Patent, is:

1. In a caterpillar tread, a series of tread units, each comprising a base and tread plate, a web between said base and tread plate, pivots at one end of the base and sockets at the other end designed to receive the pivots of a contiguous tread unit, said tread plate being provided with a transverse flange at one end and a recess at the opposite end, said recess being adapted to receive a like flange on the adjacent tread unit, the lower side of said flange and the bottom of said recess conforming respectively with arcs struck from the axis of the pivots and the center of the sockets.

2. In a tread a plurality of connected similar tread units, said tread units having pivotal connections integral therewith to permit the bending of the tread in one direction and also having coöperating devices integral with said tread units to prevent the bending of the tread in the opposite direction, each of said pivotal connections comprising a male and female member, said members being normally self-retaining but being adapted to permit separation of two adjacent units when said units are turned to a certain relative angle upon their pivots.

3. In a tread, a plurality of connected similar tread units, said tread units having pivotal connections to permit the bending of the tread in one direction and also having coöperating devices to prevent the bending of said tread in the opposite direction, said coöperating devices comprising a transverse rabbet adjacent the tread surface of the unit and having a convex wall, and transverse abutments coöperating respectively with a transverse flange and medial lugs formed on the opposite end of each tread unit in the series, each of said units being provided with a pintle and with a pintle-receiving socket, the pintle of one unit being revolubly inserted in the socket of the other unit, each pintle having a flat side and each socket having an open side which is of sufficient width to permit lateral insertion or withdrawal of a pintle when the two units concerned are turned to a certain relative angle.

In testimony whereof, I have signed my name to this specification in the presence of two subscribing witnesses.

JOHN FROELICH.

Witnesses:
F. C. CASWELL,
MAE BEAMER.